United States Patent
Tomioka et al.

[11] Patent Number: 5,853,910
[45] Date of Patent: Dec. 29, 1998

[54] FUEL CELL POWER GENERATING APPARATUS AND OPERATION METHOD THEREFOR

[75] Inventors: Norihiro Tomioka, Sapporo; Hiroehi Nakashima, Nagoya; Masataka Ueno; Koichi Shiraishi, both of Sapporo; Saki Izumisawa, Hiyama-gun, all of Japan

[73] Assignee: Kabushikikaisha Equos Research, Tokyo-to, Japan

[21] Appl. No.: 827,172

[22] Filed: Mar. 27, 1997

[30] Foreign Application Priority Data

Mar. 29, 1996 [JP] Japan .................................. 8-103883

[51] Int. Cl.⁶ .................................................. H01M 8/04
[52] U.S. Cl. ................................ 429/17; 429/23; 429/24; 429/26
[58] Field of Search ................................ 429/17, 23, 24, 429/26

[56] References Cited

U.S. PATENT DOCUMENTS

| | | | |
|---|---|---|---|
| 3,576,677 | 4/1971 | Keating et al. | 429/23 |
| 3,629,075 | 12/1971 | Gutbier | 429/26 X |
| 4,333,992 | 6/1982 | Healy | 429/17 |
| 5,200,278 | 4/1993 | Watkins et al. | 429/26 X |
| 5,543,238 | 8/1996 | Strasser | 429/17 |

FOREIGN PATENT DOCUMENTS

WO9403937 2/1994 WIPO .

*Primary Examiner*—Stephen Kalafut
*Attorney, Agent, or Firm*—Dann, Dorfman, Herrell & Skillman

[57] ABSTRACT

A fuel cell power generating apparatus using a fuel cell (10) having a structure such that a cathode and an anode are disposed on opposite sides of a polymer electrolyte membrane, comprising: an air introduction passage (11) for introducing air to the cathode; an air discharge passage (15) for discharging, to the outside of the system, discharge gas containing reactant water generated at the cathode; a circulation passage (16) connected between the air discharge passage and the air introduction passage in order to again introduce at least a portion of the discharge gas flowing through the air discharge passage to the air introduction passage and thus to the cathode; a valve (17) provided for at least one of the air introduction passage and the air discharge passage; a temperature sensor (22) for measuring the temperature of the discharge gas from the cathode; an ampere meter (19) for measuring the level of an electric current output from the fuel cell; and a control unit (18) for controlling the degree of opening of the valve in accordance with the temperature of the discharge gas and the output level of the electric current measured respectively by the temperature sensor and the ampere meter. A portion of the discharge gas containing reactant water is circulated into the air introduction passage and thus to the cathode of the fuel cell to thereby humidify the electrolyte membrane, so that there is no need to supply water from the outside of the system. The apparatus is particularly suitable to be mounted on a vehicle.

15 Claims, 9 Drawing Sheets

FUEL CELL POWER GENERATING APPARATUS AND OPERATION METHOD THEREFOR

BACKGROUND OF THE INVENTION

The present invention relates to a fuel cell power generating apparatus, and more particularly to a power generating apparatus using a polymer electrolyte membrane fuel cell and operation method therefor.

A polymer electrolyte membrane fuel cell comprises an ion conductive membrane as an electrolyte thereof so as to transmit, in the form of proton, hydrogen ions obtained at the anode of the fuel cell toward the cathode through the polymer electrolyte membrane so that electromotive force is obtained. To achieve a stable, high-level output, the electrolyte membrane must always have uniform water content. Generally, fuel gas (hydrogen) or oxidant gas (air or oxygen) has been humidified by using a humidifier, such as a bubbling machine, so as to cause humidified gas to pass through the electrolyte membrane.

However, with the above-mentioned conventional technology, the size and weight of the fuel cell cannot be reduced because peripheral units, such as the humidifier and a water reservoir tank, must be provided. This results in a critical problem when the fuel cell is mounted on a vehicle. Moreover, since the state of humidification of the electrolyte membrane is affected by the flow rate of the oxidant gas and the temperature of the cell, it is difficult to provide the electrolyte membrane with an optimum humidity.

In order to obtain stable output from the polymer electrolyte membrane fuel cell, the fuel cell must be heated to a predetermined temperature range (for example, 60° C. to 90° C.). To prevent temperature rise which would be caused from battery reactions, it is necessary to cool the fuel cell stack during operation thereof. Conventionally, a flow passage for water or coolant gas has been formed individually from the flow passage for the reaction gas. This results in a complicated and enlarged structure of the fuel cell stack and prevents cost reduction. A huge fuel cell stack is not at all practical when mounted on a vehicle.

During operation of the fuel cell stack, temperature Ts (which is the representative temperature of the stack and can be detected by a temperature sensor disposed in a substantially central cell of the stack) in the stack would usually be higher than temperature Tm (which is detected by a temperature sensor disposed at least one of oxidant gas discharge/supply manifolds). That is, the temperatures have the relationship as Ts>Tm. If there is the relationship as Ts>Tm, water is coagulated in the gas supply manifold, thus causing insufficient humidification of the electrolyte membrane. As a result, there arises a problem such that the resistance of the electrolyte membrane is increased and thus the output from the cell is lowered. If the gas is cooled in the gas supply/discharge manifold and thus water in the gas is coagulated causing water droplets to be generated, coagulated water plugs the gas flow passage on the electrode, thereby lowering the output voltage of the cell. This phenomenon becomes apparent in the air manifolds, since water is generated on the cathode attributable to the battery reactions.

Once operation of the fuel cell power generating apparatus is interrupted, the stack is not humidified by water contained in the supply gas. Water generated due to the battery reactions is also be interrupted. Therefore, the stack tends to be dried and the resistance of the electrolyte membrane is increased, which means that a sufficient output can not be generated when operation is restarted. Moreover, since the temperature of the stack is lowered after the operation has been interrupted, a considerable quantity of supplied or generated water is retained in the gas flow passage, which could plug the gas flow passage when the operation is restarted.

When the power generating apparatus is interrupted for a long time, the water content retained in the stack depends upon the outside air temperature. If the outside air temperature is high, for example, in the summer season, the water retained in the stack tends to evaporate, thereby drying the electrolyte membrane. Thus, a sufficiently high output cannot be obtained until the electrolyte membrane is again adequately humidified by the humidifier after operation of the power generating apparatus has been started. On the other hand, if the outside air temperature is low in, for example, the winter season, an excessive amount of water may be retained in the gas flow passage on the electrode. In such a case, a long time is required for the stack temperature Ts to be raised to a sufficient level after the restart. Thus, there arises a probability that the gas flow passage is closed during the foregoing long time.

SUMMARY OF THE INVENTION

Accordingly, an object of the present invention is to provide a fuel cell power generating apparatus which does not require a humidifier for humidifying a polymer electrolyte membrane and its peripheral equipment.

Another object of the present invention is to provide a fuel cell power generating apparatus that is small and suitable to be mounted on a vehicle.

Another object of the present invention is to automatically adequately adjust the quantity of water in a stack and maintain a constant output during operation of a polymer electrolyte fuel cell power generating apparatus.

Another object of the present invention is to provide a simple cooling method which makes it possible to reduce the size of a polymer electrolyte fuel cell stack.

Another object of the present invention is to improve starting easiness by maintaining an adequate water quantity in a stack even if operation of a polymer electrolyte fuel cell power generating apparatus is interrupted.

According to an aspect of the present invention, there is provided a fuel cell power generating apparatus using a fuel cell having a structure such that a cathode and an anode are disposed on opposite sides of a polymer electrolyte membrane, comprising: an air introduction passage for introducing air to the cathode; an air discharge passage for discharging, to the outside of the system, discharge gas containing reactant water generated at the cathode; a circulation passage connected between the air discharge passage and the air introduction passage in order to again introduce at least a portion of the discharge gas flowing through the air discharge passage to the air introduction passage and thus to the cathode; a valve provided for at least one of the air introduction passage and the air discharge passage; a temperature sensor for measuring the temperature of the discharge gas from the cathode; an ampere meter for measuring the level of an electric current output from the fuel cell; and a control unit for controlling the degree of opening of the valve in accordance with the temperature of the discharge gas and the output level of the electric current measured respectively by the temperature sensor and the ampere meter.

According to a preferred embodiment, the control unit stores correlation data A between the output level of the electric current from the fuel cell and the quantity of water generated within the fuel cell, correlation data B between the temperature of the discharge gas from the cathode and the quantity of saturated moisture vapor, and correlation data C between the degree of opening of the valve and the quantity of the discharge gas to be discharged to the outside of the system via the air discharge passage. The degree of opening of the valve is controlled while monitoring the temperature of the discharge gas and the output level of the electric current so as to satisfy $A = \alpha \cdot B \times C$ ($\alpha$ is a constant).

The fuel cell power generating apparatus may be provided with a cooling unit for cooling and coagulating reactant water contained in the discharge gas as moisture vapor so that the discharge gas having a reduced water content is discharged to the outside of the system via the air discharge passage.

According to another aspect of the present invention, there is provided a fuel cell power generating apparatus using a fuel cell having a structure such that a cathode and an anode are disposed on opposite sides of a polymer electrolyte membrane, comprising: an air introduction passage for introducing air to the cathode; an air discharge passage for discharging, to the outside of the system, discharge gas containing reactant water generated at the cathode; a circulation passage connected between the air discharge passage and the air introduction passage in order to again introduce at least a portion of the discharge gas flowing through the air discharge passage to the air introduction passage and thus to the cathode; a cooling unit for cooling the discharge gas flowing through the circulation passage; a valve provided for at least one of the air introduction passage and the air discharge passage; a temperature sensor for measuring the temperature of the discharge gas from the cathode; an ampere meter for measuring the level of an electric current output from the fuel cell; and a control unit for controlling the degree of opening of the valve in accordance with the temperature of the discharge gas and output level of the electric current measured respectively by the temperature sensor and the ampere meter.

Preferably, the cooling unit cools the discharge gas in the circulation passage by using heat exchange with outside air or by using heat exchange with hydrogen-absorbing material.

According to still another aspect of the present invention, there is provided a fuel cell power generating apparatus comprising: a fuel cell stack; an air circulation passage for introducing at least a portion of discharge gas discharged from the cathode of the fuel cell stack again to the cathode; a first cooling unit disposed adjacent at least one of an air supply portion and an air discharge portion of the fuel cell stack to cool the discharge gas flowing through the air circulation passage by using heat exchange with outside air; and a second cooling unit disposed adjacent at least one of the air supply portion and the air discharge portion of the fuel cell stack to cool the discharge gas flowing through the air circulation passage by using heat exchange with hydrogen-absorbing material.

The first cooling unit may comprise a cooling fan and/or a cooling fin. The second cooling unit may comprise a plurality of cylindrical manifolds made of the hydrogen-absorbing material. It is preferable that hydrogen gas, which separates from the hydrogen-absorbing material during the heat exchange in the second cooling unit, is supplied to an anode of the fuel cell stack.

According to still another aspect of the present invention, there is provided a fuel cell power generating apparatus using a fuel cell having a structure such that a cathode and an anode are disposed on opposite sides of a polymer electrolyte membrane, comprising: an air introduction passage for introducing air to the cathode; an air discharge passage for discharging, to the outside of the system, discharge gas containing reactant water generated at the cathode; a circulation passage connected between the air discharge passage and the air introduction passage in order to again introduce at least a portion of the discharge gas flowing through the air discharge passage to the air introduction passage and thus to the cathode; a valve provided for at least one of the air introduction passage and the air discharge passage; an ampere meter for measuring the level of an electric current output from the fuel cell; a first temperature sensor for measuring temperature Ts in the fuel cell, a second temperature sensor for measuring temperature Tm in an air discharge manifold of the cathode; a temperature adjusting member for heating and/or cooling at least one of the stack temperature Ts and the air discharge manifold temperature Tm; a first control unit for controlling the degree of opening of the valve in accordance with the temperature measured by at least one of the first and second temperature sensors and the output level of the electric current measured by the ampere meter; and a second control unit for controlling operation of the temperature adjusting member in accordance with a result of comparison between the stack temperature Ts measured by the first temperature sensor and the air manifold temperature Tm measured by the second temperature sensors.

The first and second control units may be designed as a single control unit.

It is preferable that the temperature adjusting member includes a stack cooler for cooling the fuel cell stack and an air manifold heater for heating the air manifold.

According to still another aspect of the present invention, there is provided a method of operating a fuel cell power generating apparatus having a structure such that a cathode and an anode are disposed on opposite sides of a polymer electrolyte membrane and having an air introduction passage for introducing air to the cathode; an air discharge passage for discharging, to the outside of the system, discharge gas containing reactant water generated at the cathode; a circulation passage connected between the air discharge passage and the air introduction passage in order to again introduce at least a portion of the discharge gas flowing through the air discharge passage to the air introduction passage and thus to the cathode; and a valve provided for at least one of the air introduction passage and the air discharge passage, the method comprising the steps of: starting operation in a state where the valve is closed so as to raise and average the temperature in the circulation passage; then opening the valve to raise the fractional pressure of gas to be supplied to the cathode of the fuel cell; measuring the temperature of the discharge gas from the cathode; measuring the output level of an electric current from the fuel cell; and controlling the degree of opening of the valve in accordance with a result of the measurement so that the fractional pressure of the gas to be supplied to the cathode is maintained within a predetermined range.

Since the present invention has the structure such that a portion of the discharge gas containing reactant water is circulated into the air introduction passage to humidify the electrolyte membrane, there is no need to supply water from the outside of the system. Therefore, the humidifier and its peripheral units which have been required in the prior arts may be omitted. The overall size and weight of the fuel cell power generating apparatus can be reduced. Thus, the apparatus according to the present invention is particularly suitable to be mounted on a vehicle.

Since air or oxidant gas is circulated in accordance with the present invention, the flow rate of the gas which passes through the fuel cell stack can be increased, which contributes to even distribution of the gas flow rates.

With the increased flow rate of gas, the power generating efficiency can be improved which, in turn, improves the power output. Moreover, the fuel cell can be operated at a higher temperature.

When the apparatus is turned on, the discharge valve is closed so that the overall quantity of the discharge gas is circulated. Therefore, the electrolyte membrane of the fuel cell can uniformly be humidified in a short period of time, and a rapid temperature rise can be realized, resulting in an improved starting characteristic or easiness.

In the succeeding usual operation, the degree of opening of the discharge valve and/or the suction valve is adjusted while monitoring the temperature of the discharge gas and the electric current level to maintain optimum water balance condition. Since the electric current level which is changed in dependence upon a load fluctuation is monitored, the present invention provides a quick response to a load fluctuation.

It is preferable that the difference between the stack temperature Ts and the air manifold temperature Tm is maintained within a predetermined range when the fuel cell power generating apparatus is in operation. When operation of the fuel cell power generating apparatus is interrupted, it is preferable that the stack temperature Ts and the air manifold temperature Tm are subjected to a comparison. In accordance with a result of the comparison, the stack temperature Ts and/or the air manifold temperature Tm is heated or cooled for temperature adjustment.

BRIEF DESCRIPTION OF THE DRAWINGS

The foregoing and other objects and features of the present invention can be apparent from the following description when read in conjunction with the accompanying drawings in which.

DETAILED DESCRIPTION OF PREFERRED EMBODIMENTS

Figure 1:
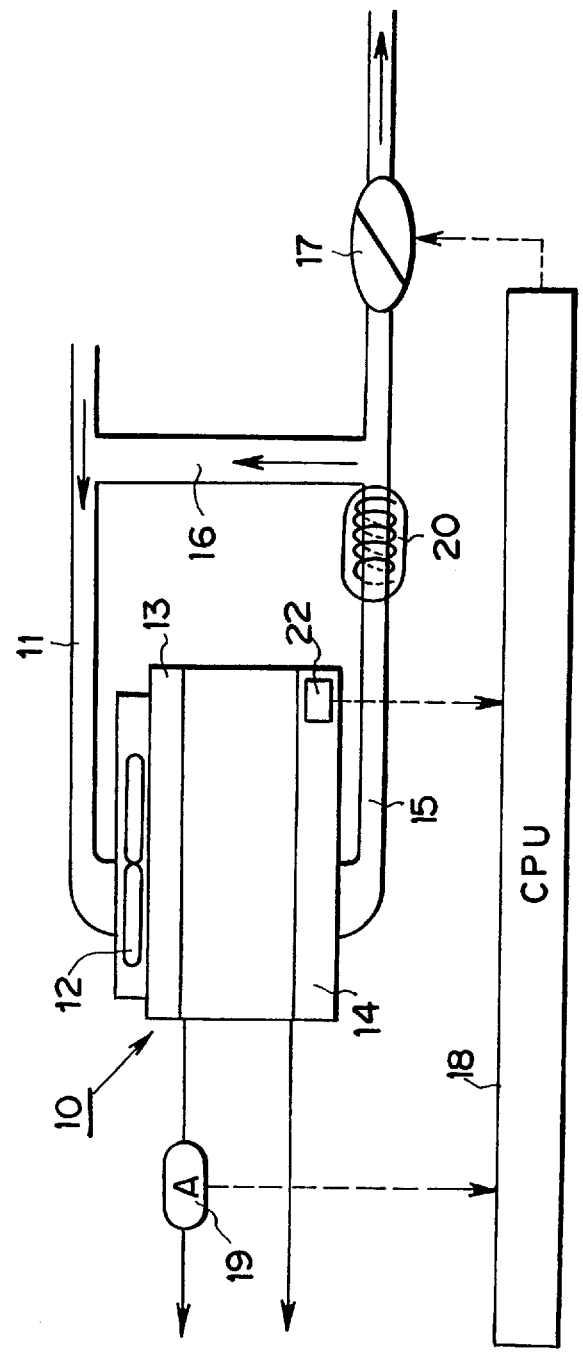
FIG. 1 is a schematic view showing the structure of a polymer electrolyte fuel cell power generating apparatus according to an embodiment of the present invention.

FIG. 1 is a schematic view showing the structure of a polymer electrolyte fuel cell power generating apparatus according to an embodiment of the present invention. In this figure, the side view of a fuel cell 10 from a cathode is shown. As has been known, the fuel cell of this type has an anode to which fuel gas, such as hydrogen, is introduced and which is disposed opposite to a cathode while interposing the polymer electrolyte membrane therebetween. The cathode is, through an air introducing passage 11, supplied with outside air serving as oxidant gas by a fan 12. In practice, the structure is formed into a stack having a multiplicity of stacked fuel cells, though a single fuel cell 10 is illustrated in FIG. 1.

As has been known, hydrogen gas is supplied to the anode and air is supplied to the cathode so that hydrogen ions, in the form of protons, are moved through the polymer electrolyte membrane to perform battery reactions. At this time, supplied oxygen reacts with moved hydrogen ions and electrons so that water is generated at the cathode. Therefore, gas discharged from an air-discharge manifold 14 of the cathode contains, in addition to non-reacted oxygen, reactant water (vapor) generated at the cathode. The discharge gas is supplied to an air discharge passage 15. Since air discharge passage 15 joins air introducing passage 11 to form a circulation passage 16, the discharge gas containing reactant water can be introduced again into the cathode. Air discharge passage 15 has, at a position exceeding the branch point for circulation passage 16, a gas discharge valve 17. Thus, the discharge gas supplied from the cathode is discharged to the outside of the system in a quantity that depends on the degree of opening of valve 17. The residual quantity of the discharge gas is allowed to pass through circulation passage 16 and air introducing passage 11 so as to be again introduced into the cathode.

Since the discharge gas containing reactant water is again introduced into the cathode of fuel cell 10, the reactant water (water vapor) is, due to difference in concentration, caused to penetrate the electrolyte membrane and thus moved toward the anode. Water moved to the anode is, as electroosmosis water, further moved to the cathode. Such water reciprocation facilitates average humidification of the electrolyte membrane.

The degree of opening of gas discharge valve 17 is determined in accordance with the correlation between the output electric current level from fuel cell 10 and the temperature of the discharge gas from the cathode. The degree of valve opening is controlled by control means (CPU) 18 in such a manner that optimal water balance condition should be given to fuel cell 10.

Figure 3:
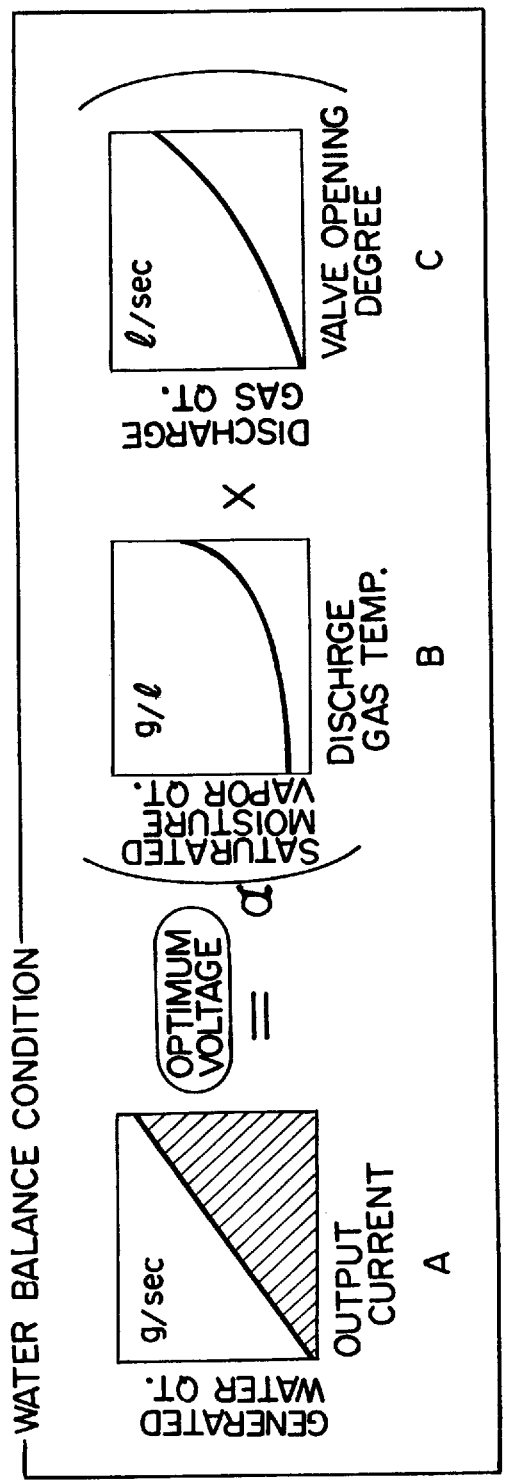
FIG. 3 is an explanatory view showing a correlation expression used as a part of control by a control unit (CPU) that controls the degree of opening of a discharge valve.

That is, CPU 18 stores below-described three correlation data for adjustment of the degree of opening of gas discharge valve 17 while monitoring the temperature of the discharge gas and the electric current level in such a manner that a relationship $A = \alpha \cdot B \times C$ can be satisfied (see FIG. 3).

A=correlation data between the electric current level output from the fuel cell and the quantity of water generated in the fuel cell B=correlation data between the temperature of the discharge gas from the cathode of the fuel cell and the quantity of saturated moisture vapor C=correlation data between the degree of opening of the gas discharge valve and the quantity of discharged gas allowed to pass through the gas discharge valve To monitor the temperature of the discharge gas and the level of the electric current, a temperature sensor 22 and an ampere meter 19 are provided. Although this embodiment has the structure such that the temperature of the discharge gas is monitored by temperature sensor 22 disposed in air-discharge manifold 14, it may be disposed in air discharge passage 15. Otherwise, a temperature sensor for measuring the temperature of the cell may be provided to obtain the cell temperature as an equivalence of the discharged gas temperature.

The procedure for turning on the fuel cell power generating apparatus will now be described. Immediately after operation has been started, gas discharge valve 17 is completely closed to circulate the discharge gas from the cathode of fuel cell 10 through air discharge passage 15, circulation passage 16 and air introducing passage 11 so as to again introduce the discharge gas into air-supply manifold 13 by fan 12. As a result, the humidity in the circulation system can satisfactorily be raised and made average. Note that symbol α in the foregoing equation is a factor affecting the above-mentioned averaging operation and is called an "averaging coefficient" for convenience. The averaging coefficient α is determined by the capacity of the circulation system including fuel cell 10 and the number of circulation, that is, the total capacity.

The method of operating the polymer electrolyte fuel cell power generating apparatus shown in FIG. 1 will now be described.

After the above-mentioned averaging operation has been performed, the closed gas discharge valve 17 is turned to be opened to thereby discharge a considerable proportion of the discharge gas to the outside of the system. Moreover, outside air is supplied from air introducing passage 11 to raise the fractional pressure of oxygen in the gas to be introduced into the cathode. Then, CPU 18 controls the opening degree of valve 17 so as to satisfy a predetermined degree of valve opening determined by the above-mentioned equation, while monitoring the discharge gas temperature and the output electric current level which are detected respectively by temperature sensor 22 and ampere meter 19. By controlling the degree of opening of valve 17, fuel cell 10 can be operated under an optimum water balance condition (in a range indicated by diagonal lines shown in FIG. 4) determined in accordance with the correlation between the cell temperature and the gas flow rate without need to supply water from outside.

Figure 2:
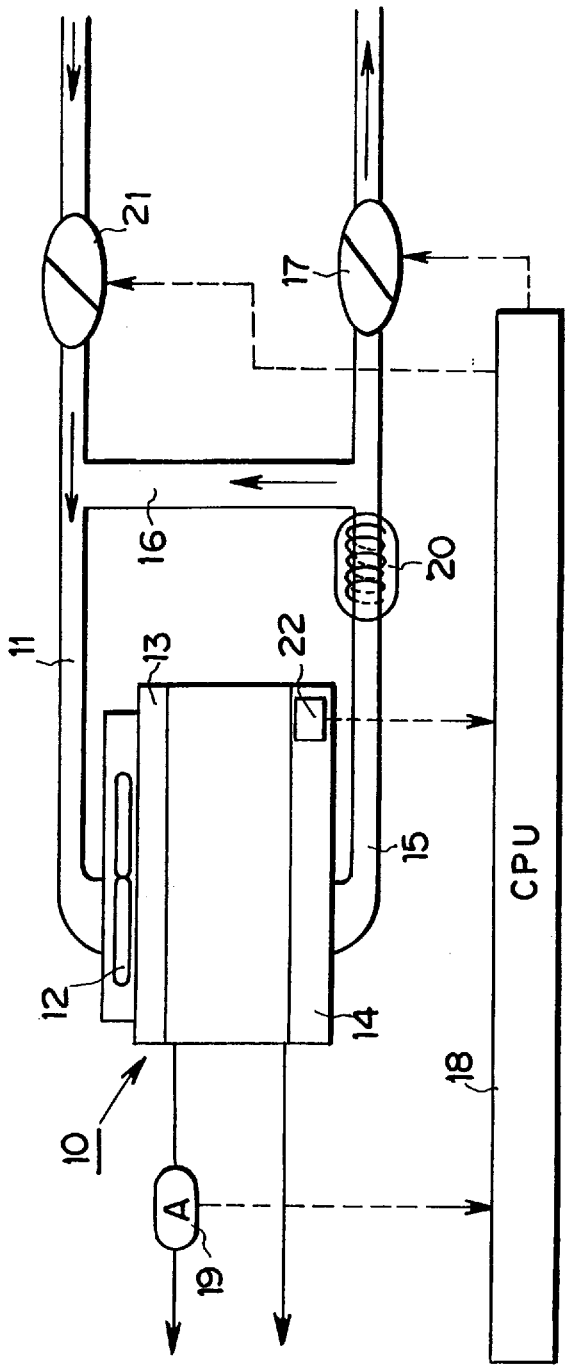
FIG. 2 is a schematic view showing a modified structure of that shown in FIG. 1.

The structure shown in FIG. 1 may be modified such that a suction valve 21 is provided for the air introducing passage 11, as shown in FIG. 2. In this structure, air in a predetermined quantity corresponding to the degree of opening of suction valve 21 is introduced from the outside of the system into the cathode. Then, a portion of the discharge gas is again introduced into the cathode through circulation passage 16. On the other hand, the residual discharge gas is discharged to the outside of the system. The degree of opening of valves 16 and 21 is, as in the foregoing structure, controlled by CPU 18 in such a manner that the relationship as A=α·B×C is satisfied while monitoring the temperature of the discharge gas and the electric current level. Thus, fuel cell 10 can be operated under an optimum water balance condition determined in accordance with the correlation between the temperature of the cell and the flow rate of the gas without need to supply water from the outside.

As shown in FIGS. 1 and 2, a cooling unit 20 for cooling the discharge gas in air discharge passage 15 may be disposed in front of gas discharge valve 17. The structure of cooling unit 20 may be formed arbitrarily. For example, cooling unit 20 may be of a structure such that cooling water is allowed to pass or the same is sprayed to the outer surface of air discharge passage 15. Since the above-mentioned cooling unit 20 causes at least a portion of reactant water contained in the discharge gas as moisture vapor to be coagulated, which reduces the quantity of reactant water to be discharged to the outside of the system through gas discharge valve 17, the quantity of water which retained in the circulation system (in particular in the cell) is relatively increased.

Figure 4:
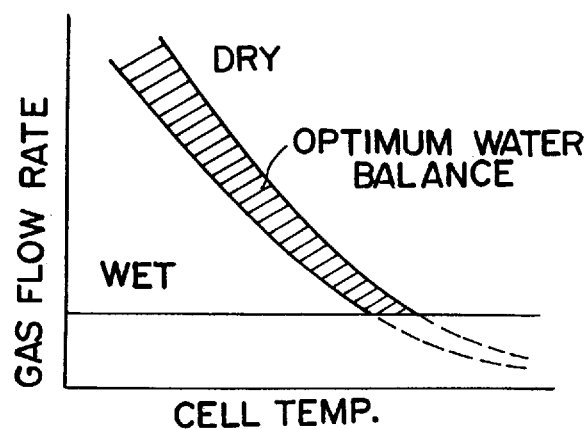
FIG. 4 is a graph showing correlation between the gas flow rate and the cell temperature to describe an optimum water balance range during operation of the fuel cell.
Figure 5:
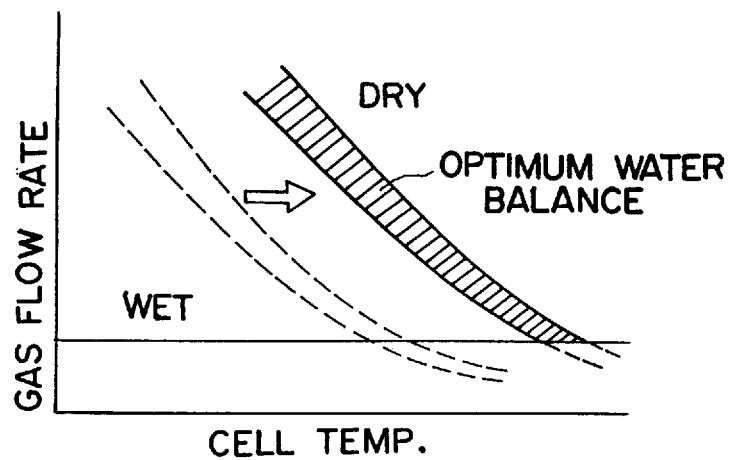
FIG. 5 is a graph showing the optimum water balance range in a case where a cooling unit is disposed in front of the discharge valve.

As described above, since the quantity of water retained in the cell is increased if cooling unit 20 is provided, the fuel cell should be operated under a condition deviated from the optimum water balance range shown in FIG. 4 toward the wet condition side. Accordingly, the gas flow rate must be increased to operate fuel cell 10 under the optimum water balance condition, as shown in FIG. 5.

As can be understood from the description above, increase of the quantity of water retained in the cell by cooling unit 20 causes fuel cell 10 to be operated in such a manner that the gas flow rate has been increased. That is, the air quantity which is introduced from air introducing passage 11 is enlarged and, thus, the density of oxygen in the air which is supplied to the cathode of fuel cell 10 is raised. Thus, the power generating efficiency and the output are raised. Moreover, the upper limit of the temperature at which fuel cell 10 can be operated is raised.

Figure 6:
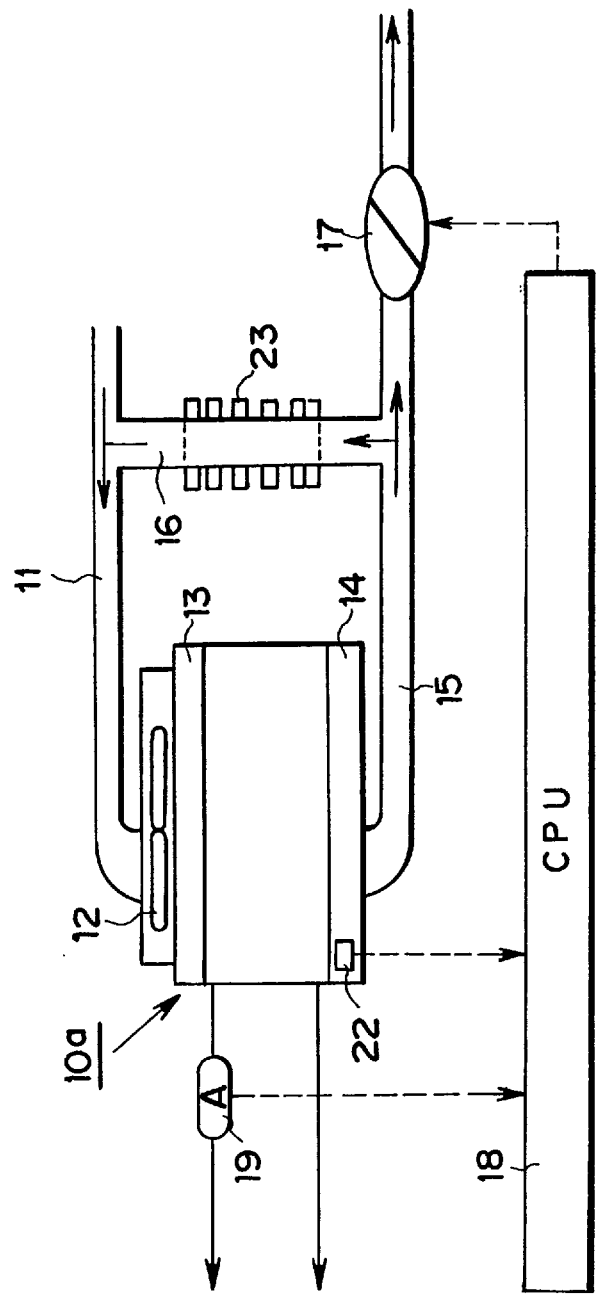
FIG. 6 is a schematic view showing another embodiment of a power generating apparatus using a polymer electrolyte fuel cell.

FIG. 6 is a schematic view showing the structure of a polymer electrolyte fuel cell according to another embodiment of the present invention. Similarly to FIG. 1, the side view of a fuel cell 10a from the cathode is shown. This embodiment has a structure similar to that shown in FIG. 1 except in that a cooling unit 23 is provided for the circulation passage 16. Although cooling unit 23 may be structured arbitrarily, the size and the cost can advantageously be reduced when cooling fins are disposed around circulation passage 16 that provides heat exchange with the outside air to cool the discharge gas flowing in circulation passage 16. A cooling fan may employ as a secondary cooling means in combination with the cooling fins. Thus, the discharge gas cooled by cooling unit 23 is introduced into the cathode through air introducing passage 11 so that the fuel cell stack can be cooled. Since the control performed by CPU 18 is similar to that of the foregoing embodiment, it is omitted from description.

Figure 7:
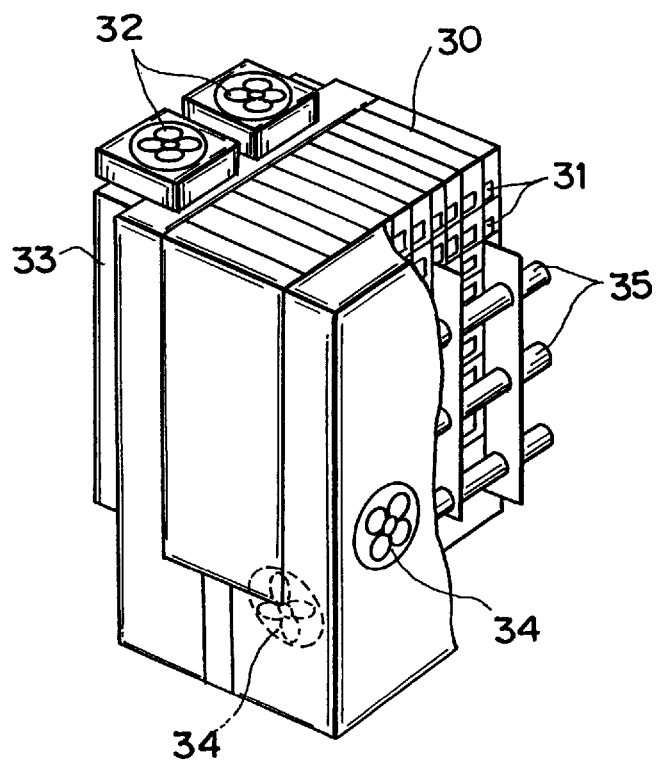
FIG. 7 is a partially broken perspective view schematically showing a polymer electrolyte fuel cell stack according to still another embodiment of the present invention.
Figure 8:
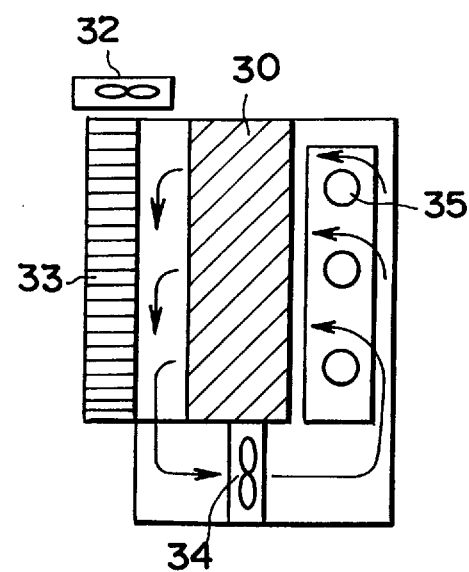
FIG. 8 is a cross sectional view schematically showing the air flow in the stack of FIG. 3.

An embodiment shown in FIGS. 7 and 8 is formed by arranging the structure shown in FIG. 6 such that the air circulation passage is formed integrally with the fuel cell stack. In the thus-formed fuel cell stack 30, air (oxidant gas) is supplied to an air fluid passage 31 from this side in the right-hand portion of FIG. 7. The discharge gas discharged from stack 30 is, by a cooling fan 32 and a cooling fin 33, heat-exchanged with outside air and thus cooled. Then, the discharge gas is again introduced into air fluid passage 31 by a circulation fan 34 disposed in the bottom of stack 30. Circulation fan 34 may be an arbitrary fan, for example, a cross flow fan, a propeller fan and a sirocco fan.

Stack 30 has a manifold 35 disposed at a position adjacent to air fluid passage 31 and made of hydrogen-absorbing material. The circulating air is allowed to pass through manifold 35, and then again introduced into air fluid passage 31. Thus, the air circulation flow passage is formed as particularly shown in FIG. 8.

The hydrogen-absorbing material includes any alloy which absorbs hydrogen by exothermic reactions and separates the absorbed hydrogen by endothermic reactions. The said alloy includes binary alloys such as $LaNi_5$, TiFe, $ZrMn_2$ and $Mg_2Ni$. $LaNi_5$ provides such endothermic reactions as $LaNi_5H_6 \rightarrow LaNi_5 + 3H_2$, when heated to about 50° C. to about 80° C., causing hydrogen gas to be discharged by about 300 liters per hour.

The circulating air is discharged from air fluid passage 31 in stack 30, and then cooled by cooling fan 32 and cooling fin 33. The circulating air is further cooled by applying heat to the hydrogen absorption allow in the above described manner, when it passes through manifold 35. That is, the circulating air is heat-exchanged with both of the outside air and the hydrogen-absorbing material so that it is again introduced into air fluid passage 31 in a sufficiently cooled condition, thereby preventing a temperature rise of stack 30.

Hydrogen gas discharged from the hydrogen-absorbing material during the foregoing reactions is allowed to flow from manifold 35 through a predetermined flow passage (not shown) so as to be supplied to a hydrogen electrode of stack 30, followed by being consumed in the battery reactions before it is discharged. The flow passage for hydrogen gas in stack 30 may be formed as a perpendicular method in which it flows perpendicularly to air or as an opposite flow method in which it flows in an opposite direction to the air flow.

In FIG. 7, a suction port to be connected to air introducing passage 11 (see FIG. 6) for introducing fresh air from the outside of the system and a discharge port to be connected to air discharge passage 15 (see FIG. 6) for discharging gas to the outside of the system are both omitted from illustration. Although FIGS. 7 and 8 show the structure in which the cooling means consisting of cooling fan 32 and cooling fin 33 is provided adjacent to the air discharge portion and the cooling portion for performing heat exchange with hydrogen-absorbing material of manifold 35 is provided adjacent to the air supply portion, such positions may be reversed.

Figure 9:
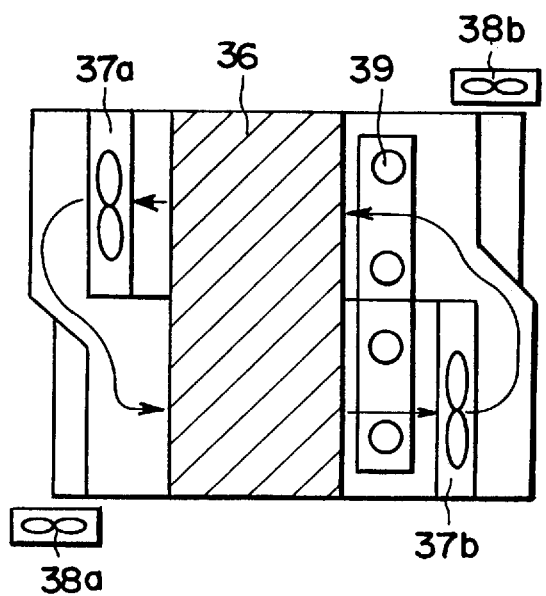
FIG. 9 is a cross sectional view showing a polymer electrolyte fuel cell stack according to still another embodiment of the present invention, shown in substantially the same manner as in FIG. 8.

Another example of the structure in which air is circulated through a circulation passage formed integrally with the fuel cell stack is shown in FIG. 9. This example has a structure such that the air flow direction in the air flow passage (not shown) in stack 36 is made opposite between the upper and lower half portions of stack 36; and a cooling fan 38 is provided for each of the air discharge portion. In this case, air which has passed through the air flow passage in the upper half portion of stack 36 is discharged therefrom and introduced by a circulation fan 37a into the lower portion where it is cooled by a cooling fan 38a. Then, the cooled air is introduced into the air flow passage in the lower half portion of stack 36 and discharged to the opposite side of stack 36. The discharged air is cooled due to heat exchange when it passes through the hydrogen-absorbing manifold 39. It is then supplied by a circulation fan 37b to the upper half portion where it is cooled by a cooling fan 38b and again by the hydrogen-absorbing manifold 39. Then, air is introduced into the air flow passage in the upper half portion of stack 36.

Since the air circulation flow passage is formed as described above and air to be supplied to stack 36 is sufficiently cooled, rise in the temperature of the stack can be prevented even during long-time operation of the fuel cell.

Figure 10:
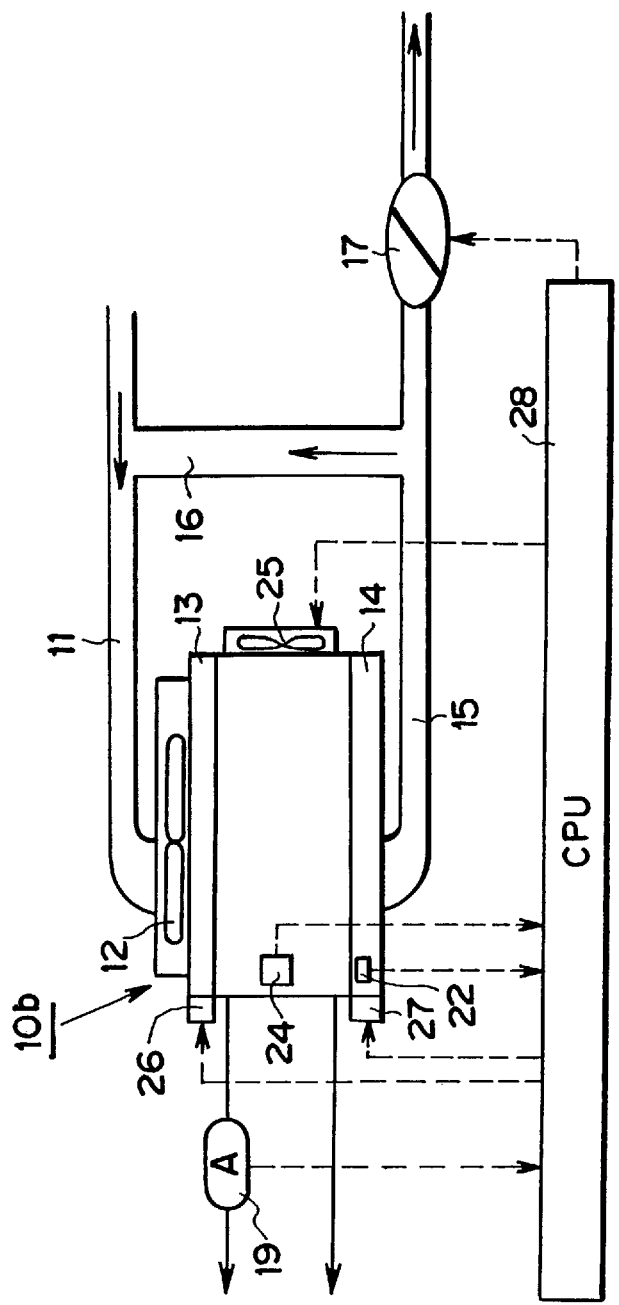
FIG. 10 is a schematic view showing a polymer electrolyte fuel cell power generating apparatus according to still another embodiment of the present invention.

FIG. 10 is a schematic view showing another embodiment of the polymer electrolyte fuel cell according to the present invention. The side view of a fuel cell 10b from a portion adjacent to the cathode is shown, similarly to FIGS. 1 and 6. Also in this embodiment, the following structure is the same as those of the foregoing embodiments in which a predetermined quantity of the gas discharged from the cathode corresponding to the degree of opening of gas discharge valve 17 is discharged to the outside of the system. The residual portion of the discharge gas is allowed to pass through circulation passage 16 and air introducing passage 11, and then again introduced into the cathode. The degree of opening of valve 17 is controlled by CPU 28 which monitors the output electric current and the temperature of the discharge gas detected respectively by ampere meter 19 and temperature sensor 22. The foregoing similar features are not described in more detail.

In this embodiment, there are provided a stack temperature sensor 24 for monitoring temperature Ts of the fuel cell stack and an air discharge manifold temperature sensor 22 for monitoring temperature Tm of the air discharge manifold. Moreover, this embodiment is provided with a cooling fan 25, a heater 26 for heating air-supply manifold 13 and a heater 27 for heating air-discharge manifold 14.

Operation of cooling fan 25, heater 26 and heater 27 are controlled by CPU 28 in accordance with results of comparison of the stack temperature Ts and the temperature Tm of air-discharge manifold 14 by a procedure to be described later with reference to FIG. 11.

When the fuel cell power generating apparatus is structured such that air to be discharged from the cathode is again introduced into the cathode through circulation passage 16 as shown in FIG. 10, at least a portion of discharged air heated by air-discharge manifold heater 27 is introduced into the cathode. Therefore, the means (heater 26) for heating air-supply manifold 13 can be omitted from the structure.

It is preferable that air-supply manifolds 13 and 14, in particular, air-discharge manifold 14 has a moisture absorbent for absorbing inside excess water. Although an arbitrary moisture absorbent may be employed, for example, a fiber sheet or porous particles are included in air-discharge manifold 14 to absorb coagulated excess water.

In a preferable embodiment, air-supply manifold 13 includes an ion exchange resin for purifying air to be supplied to the fuel cell stack. Since the ion exchange resin generally has water absorption characteristic, it also facilitates a smooth gas flow.

Figure 11:
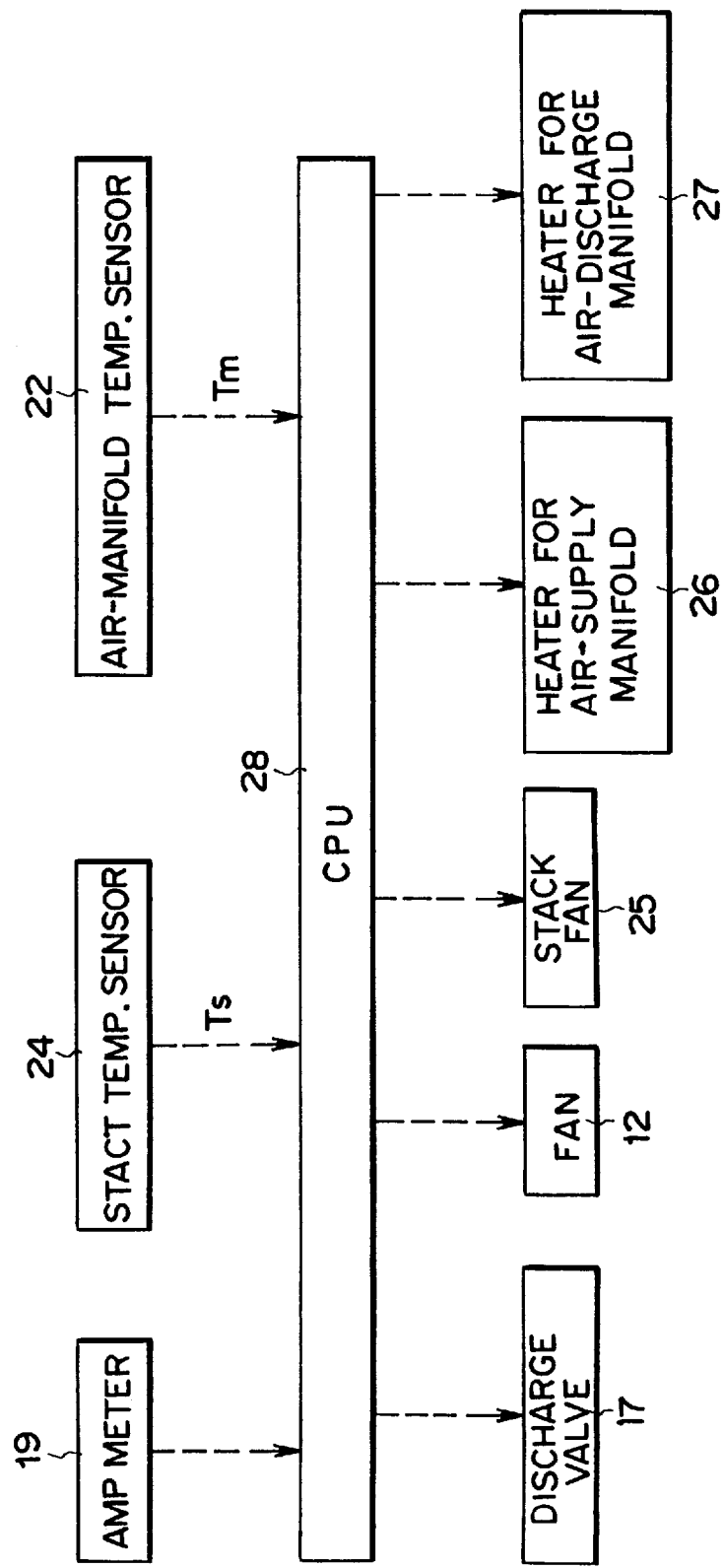
FIG. 11 is a block diagram showing a control system of the polymer electrolyte fuel cell power generating apparatus shown in FIG. 10.

FIG. 11 shows a control system for a polymer electrolyte fuel cell power generating apparatus according to the embodiment shown in FIG. 10. The stack temperature sensor 24 is provided for the substantially central cell of the stack in order to measure the temperature Ts of the fuel cell stack. The air manifold temperature sensor 22 is provided for the air manifold to measure temperature Tm in the air manifold. In this embodiment, air manifold temperature sensor 22 is provided to measure temperature Tm of the discharged gas in air-discharge manifold 14. Therefore, temperature sensor 22 according to the embodiments shown in FIGS. 1 and 6 is employed as it is. If it is the case, another temperature sensor may be provided for air-supply manifold 13 to measure the temperature of the gas supplied to the cathode.

The stack temperature Ts and the air manifold temperature Tm measured by temperature sensors 24 and 22 are supplied to CPU 28. CPU 28 subjects the stack temperature Ts and the air manifold temperature Tm to a comparison. In accordance with a result of the comparison, CPU 28 selectively controls the operations of fan 12 for introducing air to air-supply manifold 13, cooling fan 25 for cooling the stack, heater 26 for hating air-supply manifold 13 and heater 27 for heating the air discharge manifold.

The relationship as Ts>Tm is generally satisfied during operation of the fuel cell. If the this state is remained for a long period of time, however, water could be coagulated in the air manifold, the temperature of which is lower than that of the stack, thus causing the gas flow passage on the cathode to be choked up. Moreover, the electrolyte membrane is dried so as to increase its resistance, which greatly reduces the output voltage. Therefore, if it is determined as a result of the measurement by sensors 24 and 22 that Ts>Tm has been satisfied, CPU 28 turns on fan 12, turns on cooling fan 25, turns off air-supply manifold heater 26 and turns on air-discharge manifold heater 27 to cool the stack. Moreover, the air-discharge manifold is heated. Thus, control is performed so that the relationship as Ts=Tm is substantially satisfied. Such control will reduce the quantity of water coagulated in the air manifold, prevent closing of the gas flow passage adjacent to the cathode and cause the electrolyte membrane to be suitably humidified.

If the relationship as Ts<Tm is satisfied during operation of the fuel cell, water should be coagulated in the stack. Although water coagulated in the stack is partially absorbed by the electrolyte membrane which contributes to humidification of the electrolyte film, if there is an excessive quantity of water coagulated in the stack, the gas flow passage on the electrode could be choked up. Therefore, if it is determined that the relationship as Ts<Tm is satisfied, CPU 28 turns on fan 12, turns off cooling fan 25, turns on air-supply manifold heater 26 and turns off air-discharge manifold heater 27 so as to heat the stack. Such control is performed in order to substantially realize the relationship as Ts=Tm, thereby reducing the quantity of water coagulated in the stack and preventing closing of the gas flow passage adjacent to the cathode.

Since coagulated water in the stack is somewhat absorbed by the electrolyte membrane as described above, a temperature difference of about 5° C. is permitted if Ts<Tm. If Ts>Tm, however, coagulated water in the manifold provides a great influence on closure of the gas flow, so that the difference in the temperature must be restrained to be 3° C. or smaller. CPU 28 controls the relationship between Ts and Tm to be included in the above-mentioned temperature difference range during operation of the fuel cell.

When operation of the fuel cell is interrupted continuously for a short time (for example, one or two nights and days) and where the outside air does not considerably change the temperature of water retained in the stack as in spring or autumn, CPU 28 performs control similar to the foregoing control during operation, when the load has been interrupted or immediately after the load has been interrupted, so that the difference between Ts and Tm is included in the predetermined temperature difference range (for example, a temperature difference of 3° C. or smaller when the temperature ranges 60° C. to 90° C.).

If the interruption of operation is continued for several days or longer, or if water retained in the stack is evaporated and thus the electrolyte membrane is dried due to high outside air temperature especially in the summer even if operation is interrupted for a relatively short time, or if a long time is required to raise the temperature when the apparatus is turned on because of low outside air temperature especially in the winter, CPU performs the apparatus in the following manner.

In summer, stack cooling fan 25 is operated for a certain period even after fan 12 has been interrupted after the interruption of the load, to thereby make the stack temperature Ts to be lower than the air-discharge manifold temperature Tm. As a result, coagulation of water takes place in the stack, causing the quantity of water retained in the stack to be enlarged as compared with the quantity during the operation. Therefore, the appropriate wet state of the electrolyte membrane can be maintained even in the interruption period, which shortens time required to restart the apparatus.

In winter, air fan 12 is turned on after the load has been interrupted. Moreover, heater 27 for the air-discharge manifold is turned on, while stack cooling fan 25 is turned off. As a result, the air-discharge manifold temperature Tm is made to be lower than the stack temperature Ts and water in the gas flow passage on the electrodes of the inoperative fuel cell is discharged, which prevents closing of the flow passage with water in the gas flow passage when the apparatus is restarted and the stack temperature is raised.

Stack cooling fan 25, heater 26 for the air-supply manifold and heater 27 for the air-discharge manifold may have arbitrary structures. In place of the above-mentioned units, arbitrary units capable of performing similar operation and obtaining similar effects may be employed. In place of stack cooling fan 25 employed as a representative air cooling unit, a water cooling unit using cooling water to cool the stack may be employed. If the fuel cell power generation apparatus is mounted on a vehicle, water in the radiator may be employed as heating means for the air-supply manifold and the air-discharge manifold to heat the manifolds.

Although the invention has been described in connection with specific embodiments, it is to be understood that the present invention is not limited to these illustrated embodiments and that various changed and modifications may be effected therein by one skilled in the art without departing from the spirit and the scope of the invention as defined in the appended claims.

What we claim is:

1. A fuel cell power generating apparatus using a fuel cell having a structure such that a cathode and an anode are disposed on opposite sides of a polymer electrolyte membrane, comprising: an air introduction passage for introducing air to the cathode; an air discharge passage for discharging to the outside of the system discharge gas containing reactant water generated at the cathode; a circulation passage connected between said air discharge passage and said air introduction passage in order to again introduce at least a portion of the discharge gas flowing through said air discharge passage to said air introduction passage and thus to the cathode; a valve provided along at least one of said air introduction and air discharge passages; a temperature sensor for measuring the temperature of the discharge gas from the cathode; an ampere meter for measuring the level of an electric current output from the fuel cell; and a control unit for controlling the degree of opening of said valve in accordance with the temperature of the discharge gas and the output level of the electric current measured respectively by said temperature sensor and said ampere meter.

2. A fuel cell power generating apparatus according to claim 1 wherein said control unit stores correlation data A between the output level of the electric current from the fuel cell and the quantity of water generated within the fuel cell, correlation data B between the temperature of the discharge gas from the cathode and the quantity of saturated moisture vapor, and correlation data C between the degree of opening of said valve and the quantity of the discharge gas to be discharged to the outside of the system via said air discharge passage, and the degree of opening of said valve is controlled while monitoring the temperature of the discharge gas and the output level of the electric current so as to satisfy A=α·B×C (α is a constant).

3. A fuel cell power generating apparatus according to claim 1 further comprising a cooling unit for cooling and coagulating reactant water contained in the discharge gas as moisture vapor so that the discharge gas having a reduced water content is discharged to the outside of the system via said air discharge passage.

4. A fuel cell power generating apparatus using a fuel cell having a structure such that a cathode and an anode are disposed on opposite sides of a polymer electrolyte membrane, comprising: an air introduction passage for introducing air to the cathode; an air discharge passage for discharging to the outside of the system discharge gas containing reactant water generated at the cathode; a circulation passage connected between said air discharge passage and said air introduction passage in order to again introduce at least a portion of the discharge gas flowing through said air discharge passage to said air introduction passage and thus to the cathode; a cooling unit for cooling the discharge gas flowing through said circulation passage; a valve provided along at least one of said air introduction and air discharge passages; a temperature sensor for measuring the temperature of the discharge gas from the cathode; an ampere meter for measuring the level of an electric current output for the fuel cell; and a control unit for controlling the degree of opening of said valve in accordance with temperature of the discharge gas and output level of the electric current measured respectively by said temperature sensor and said ampere meter.

5. A fuel cell power generating apparatus according to claim 4 wherein said cooling unit cools the discharge gas in said circulation passage by using heat exchange with outside air.

6. A fuel cell power generating apparatus according to claim 4 said cooling unit cools the discharge gas in said circulation passage by using heat exchange with hydrogen-absorbing material.

7. A fuel cell power generating apparatus comprising: a fuel cell stack; an air circulation passage for introducing at least a portion of discharge gas discharged from the cathode of the fuel cell stack again to the cathode; a first cooling unit disposed adjacent at least one of an air supply portion and an air discharge portion of the fuel cell stack to cool the discharge gas flowing through said air circulation passage by using heat exchange with outside air; and a second cooling unit disposed adjacent at least one of the air supply portion and the air discharge portion of the fuel cell stack to cool the discharge gas flowing through said air circulation passage by using heat exchange with hydrogen-absorbing material.

8. A fuel cell power generating apparatus according to claim 7 wherein said first cooling unit comprises a cooling fan and/or a cooling fin.

9. A fuel cell power generating apparatus according to claim 7 wherein said second cooling unit comprises a plurality of cylindrical manifolds made of the hydrogen-absorbing material.

10. A fuel cell power generating apparatus according to claim 7 wherein hydrogen gas, which separates from the hydrogen-absorbing material during the heat exchange in said second cooling unit, is supplied to an anode of the fuel cell stack.

11. A fuel cell power generating apparatus using a fuel cell having a structure such that a cathode and an anode are disposed on opposite sides of a polymer electrolyte membrane, comprising: an air introduction passage for introducing air to the cathode; an air discharge passage for discharging to the outside of the system discharge gas containing reactant water generated at the cathode; a circulation passage connected between said air discharge passage and said air introduction passage in order to again introduce at least a portion of the discharge gas flowing through said air discharge passage to said air introduction passage and thus to the cathode; a valve provided along at least one of said air introduction and air discharge passages; an ampere meter for measuring the level of an electric current output from the fuel cell; a first temperature sensor for measuring temperature Ts in the fuel cell; a second temperature sensor for measuring temperature Tm in an air discharge manifold of the cathode; a temperature adjusting member for heating and/or cooling at least one of the stack temperature Ts and the air discharge manifold temperature Tm; a first control unit for controlling the degree of opening of said valve in accordance with the temperature measured by at least one of said first and second temperature sensors and the output level of the electric current measured by said ampere meter; and a second control unit for controlling operation of the temperature adjusting member in accordance with a result of comparison between the stack temperature Ts measured by said first temperature sensor and the air manifold temperature Tm measured by said second temperature sensors.

12. A fuel cell power generating apparatus according to claim 11 wherein said temperature adjusting member includes a stack cooler for cooling the fuel cell stack and an air manifold heater for heating the air manifold.

13. A method of operating a fuel cell power generating apparatus having a stack structure such that a cathode and an anode are disposed on opposite sides of a polymer electrolyte membrane and having an air introduction passage for introducing air to the cathode, said air introduction passage including an oxidant gas manifold; an air discharge passage for discharging to the outside of the system discharge gas containing reactant water generated at the cathode; a circulation passage connected between the air discharge passage and the air introduction passage in order to again introduce at least a portion of the discharge gas flowing through the air discharge passage to the air introduction passage past the manifold and thus to the cathode; and a valve provided along at least one of the air introduction and the air discharge passages, the method comprising the steps of: starting operation in a state where the valve is closed so as to raise and average the temperature in the circulation passage; then opening the valve to raise the fractional pressure of gas to be supplied to the cathode of the fuel cell; measuring the temperature of the discharge gas from the cathode; measuring the output level of an electric current from the fuel cell; and controlling the degree of opening of the valve in accordance with a result of the measurement so that the fractional pressure of the gas to be supplied to the cathode is maintained within a predetermined range.

14. A method according to claim 13 wherein the difference in the temperature between the stack temperature Ts and the oxidant gas manifold temperature Tm is maintained to be included in a predetermined range.

15. A method according to claim 13 wherein the temperature is adjusted when the operation of said fuel cell power generating apparatus is interrupted such that said stack temperature Ts and the oxidant gas manifold temperature Tm are subjected to a comparison, and at least one of said temperatures Ts and Tm is raised or lowered in accordance with a result of said comparison.

* * * * *

UNITED STATES PATENT AND TRADEMARK OFFICE
CERTIFICATE OF CORRECTION

PATENT NO. : 5,853,910
DATED : December 29, 1998
INVENTOR(S) : TOMIOKA, ET AL.

It is certified that error appears in the above-identified patent and that said Letters Patent is hereby corrected as shown below:

<u>COVER PAGE</u>:

Item: [75] Inventors: "Hiroehi" should be --Hiroshi--

Item: [73] Assignee: after "Japan" add --and AISIN AW Co. Ltd. Aichi-ken, Japan--

Signed and Sealed this

Fifteenth Day of June, 1999

Attest:

Q. TODD DICKINSON

Attesting Officer

Acting Commissioner of Patents and Trademarks